Feb. 9, 1926.

T. M. FINLEY ET AL 1,572,523

ENGINE

Filed Jan. 14, 1920  10 Sheets-Sheet 1

Inventors
T.M.Finley.
A.W.Brown.
By Harry T. Riley Attorney

Feb. 9, 1926.

T. M. FINLEY ET AL

ENGINE

Filed Jan. 14, 1920    10 Sheets-Sheet 8

1,572,523

Inventors
T. M. Finley.
A. W. Brown.
By Harry F. Riley Attorney

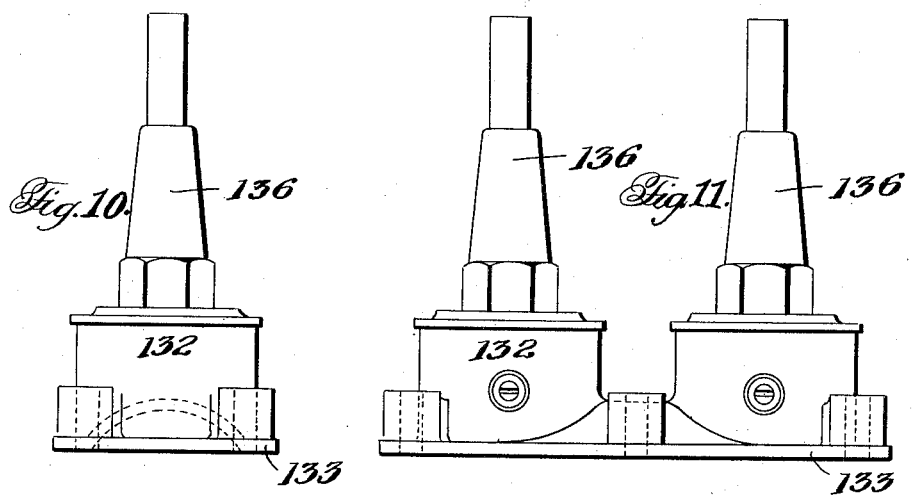
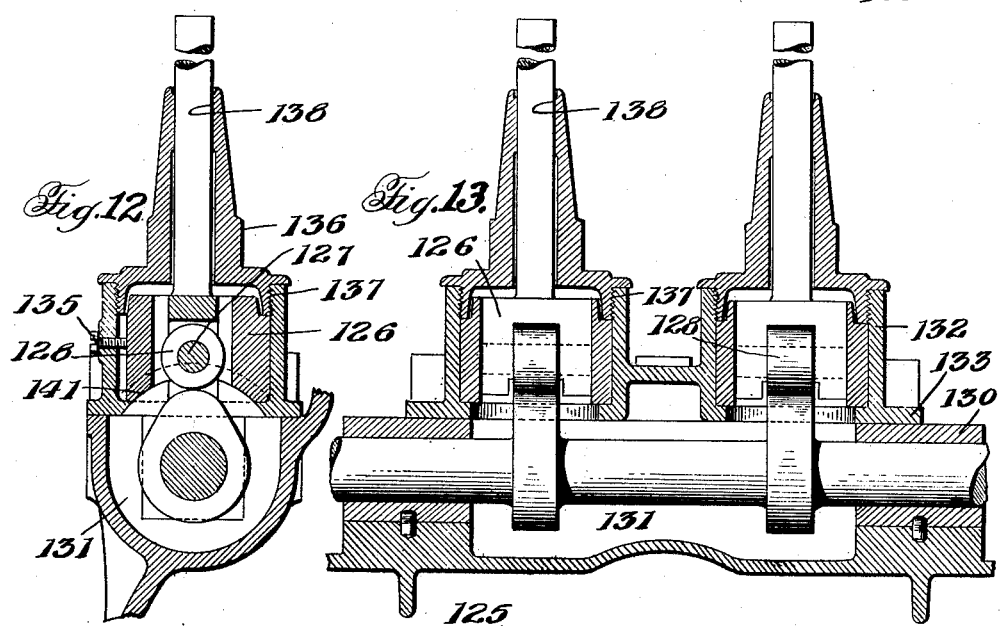
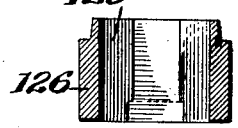
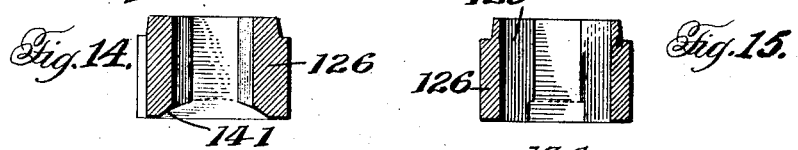
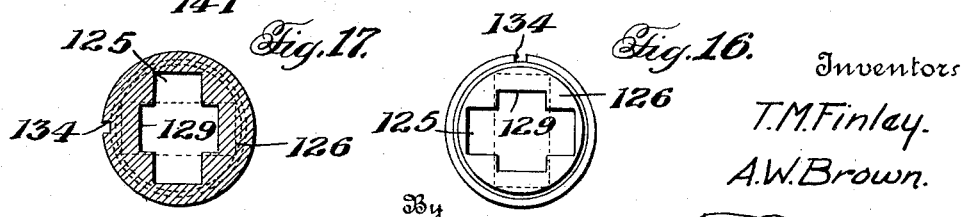

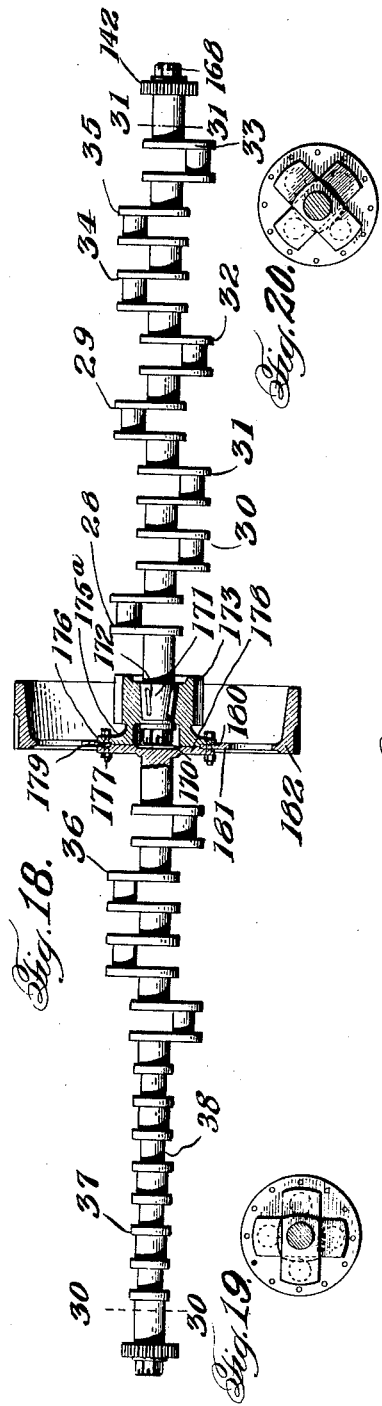
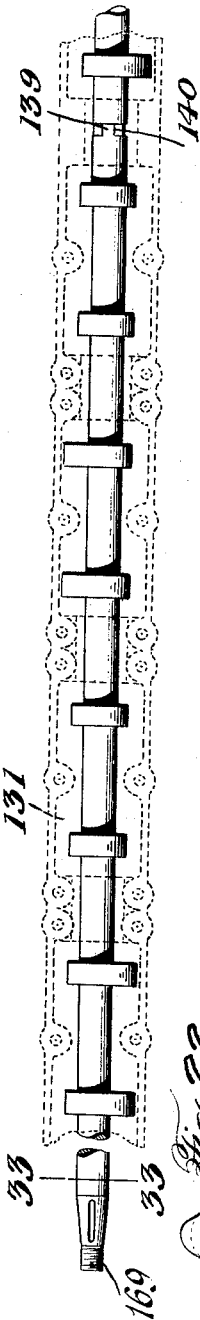
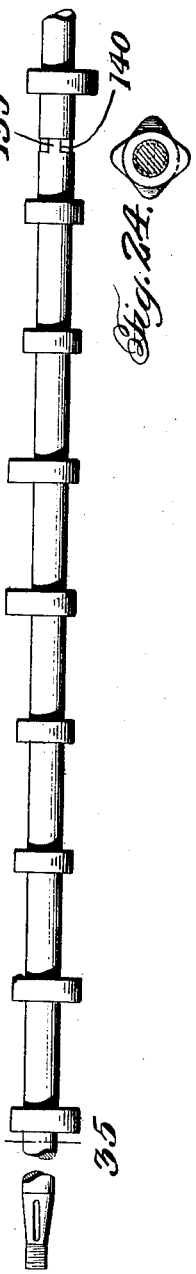

Patented Feb. 9, 1926.

1,572,523

UNITED STATES PATENT OFFICE.

THOMAS MILTON FINLEY AND ALLEN W. BROWN, OF ST. LOUIS, MISSOURI.

ENGINE.

Application filed January 14, 1920. Serial No. 351,346.

*To all whom it may concern:*

Be it known that we, THOMAS M. FINLEY and ALLEN W. BROWN, citizens of the United States, residing at St. Louis, State of Missouri, have invented certain new and useful Improvements in Engines, of which the following is a specification.

The invention relates to a motor for aeronautical and other purposes in which two engine units are arranged one in rear of the other.

The object of the present invention is to provide a 16-cylinder motor having the cylinders arranged in longitudinal alignment with a central output of the power and with two centrally coupled crank shafts whereby the severe torsional strain incident to the employment of a single continuous crank shaft is eliminated.

A further object of the invention is to provide a motor of this character, composed of two sections, each consisting of two sets of four cylinders with the sets in which sets the couple arising from one pair of cylinders will be balanced by that of the other pair of cylinders so that the sets of cylinders will be perfectly balanced explosively and mechanically and give no couple.

A further object of the invention is to provide a motor, adapted to operate constantly at high rotative speeds with a maximum delivery of power and function for extended periods at maximum speed and in which there will be nothing freakish but which will adhere to standard forms and be composed of parts of such size that every quality making for reliability, efficiency and endurance will be incorporated in it.

Another object of the invention is to provide a motor adapted to afford ready access to its components for easy repair, adjustment and replacement and constitute a practical power plant capable of extended operation without necessitating rebuilding the engine or requiring the same to be put out of commission for any considerable length of time.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction within the scope of the claims may be resorted to without departing from the spirit or sacrificing any of the advantages of the invention.

In the drawings, in which like characters of reference designate corresponding parts in the several figures:

Figures 10 and 11 are large detail end and side elevations of the housings for guiding the lower ends of the cam actuated rods.

Figure 12 is an enlarged detail, transverse, sectional view of one of the cams and cam actuated rods, illustrating the construction of the cam receiving pockets and the housing for guiding the cam actuated rod.

Figure 13 is an enlarged detail view taken longitudinally of the cam shaft showing a pair of cams and the rods actuated thereby.

Figures 14 and 15 are detail, vertical, sectional views of the guide sleeve.

Figure 16 is a detail plan view of the guide sleeve.

Figure 17 is a detail, horizontal, sectional view of the same.

Figure 18 is an isometric plan view of the crank shaft.

Figure 19 is a transverse, sectional view on line 30—30 of Figure 18.

Figure 20 is a transverse, sectional view on line 31—31 of Figure 18.

Figure 21 is a plan view of the cam shaft for operating the inlet valves.

Figure 22 is a transverse, sectional view on the line 33—33 of Figure 21.

Figure 23 is a plan view of the cam shaft for operating the exhaust valves.

Figure 24 is a transverse, sectional view on the line 35—35 of Figure 23.

In the accompanying drawings in which is illustrated one embodiment of the invention, the engine comprises in its construction two similar engine sections which for convenience will be termed front and rear engine sections, each composed of two sets of four cylinders, connected at the center by coupling gearing which enables the power of the engine to be taken centrally from the engine. Only the front or right-hand section of the engine is illustrated fully in detail, as both sections of the engine are constructed substantially the same and a detail description of the construction and the operation of one section will apply to the other section with the exception of the arrangement of the cranks and the position of the cams which are hereinafter fully described and shown. This will eliminate unnecessary description and illustration and avoid duplication. Also the oil sump and the lubricant pumping means hereinafter described, and constituting the subject matter of a divisional application filed January 14, 1920, Serial No. 351,347, are applied only to the right-hand or front section of the engine, a single pumping means being ample to supply both sections of the engine with the lubricant.

Figure 1:
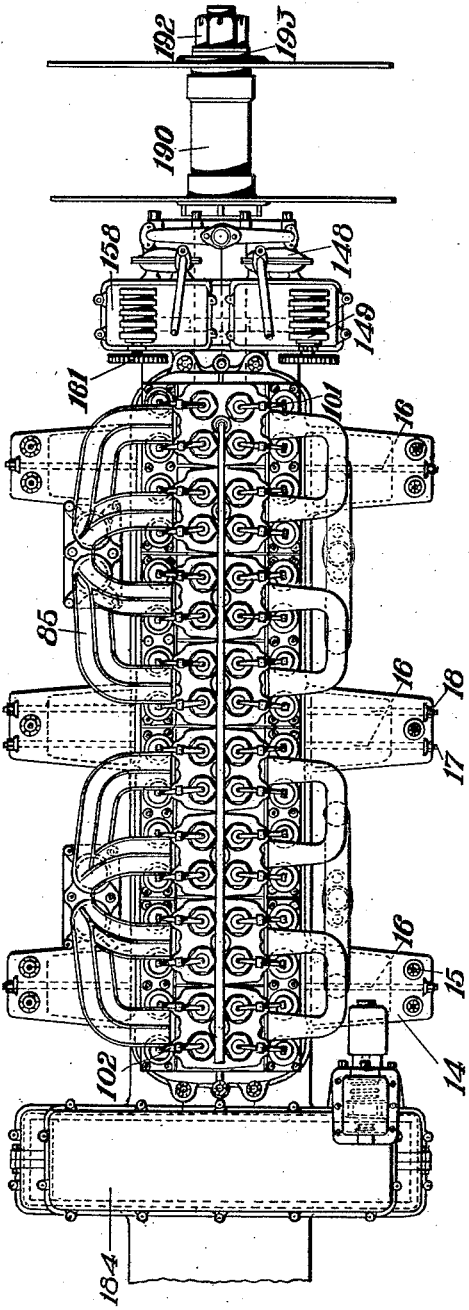
Figure 1 is a plan view of one section, the coupling means and a portion of the other section of a motor constructed in accordance with this invention, parts of the cooling mechanism being omitted.

The cylinders of the engine are 16 in number and are arranged in longitudinal alignment and the front or right-hand engine section has cylinders, 1, 2, 3, 4, 5, 6, 7 and 8, arranged vertically and comprising two sets of four. The cylinders are mounted upon a sectional crank case composed of substantially semi-cylindrical upper and lower sections 9 and 10 (see Figure 6) consisting preferably of aluminum castings to reduce to a minimum the ratio of the mass or weight of the engine to the power of the engine. The lower section of the crank case is provided with a depending walled extension 11 constituting the upper section of an oil sump 12 which is tapered downwardly and also longitudinally toward each end as clearly illustrated in Figure 5 of the drawing for directing the lubricant, flowing back into the oil sump, to an oil pump 208 located at the bottom of the oil sump. The lower section of the crank case is provided with laterally extending bed plate members 14 extending from the ends and the center crank case as clearly shown in Figure 1 of the drawings, but any desired number of the bed plate members may of course be employed and the said bed plate members are hollow and are adapted to receive vertical bolts 15 for securing the engine in position and they are also strengthened by transverse tension rods 16 threaded at their outer ends 17 for the reception of nuts 18 which abut against the outer ends of the projecting bed plate or supporting members. Any desired number of tension rods may of course be employed and in Figure 1 of the drawings a tension rod 16 is arranged at each end of the crank case and a pair of tension rods are located at the central portion of the crank case. The transverse tension rods put the aluminum casting in tension and enable it to carry all the transverse stresses which would otherwise disrupt the casting.

Figure 5:
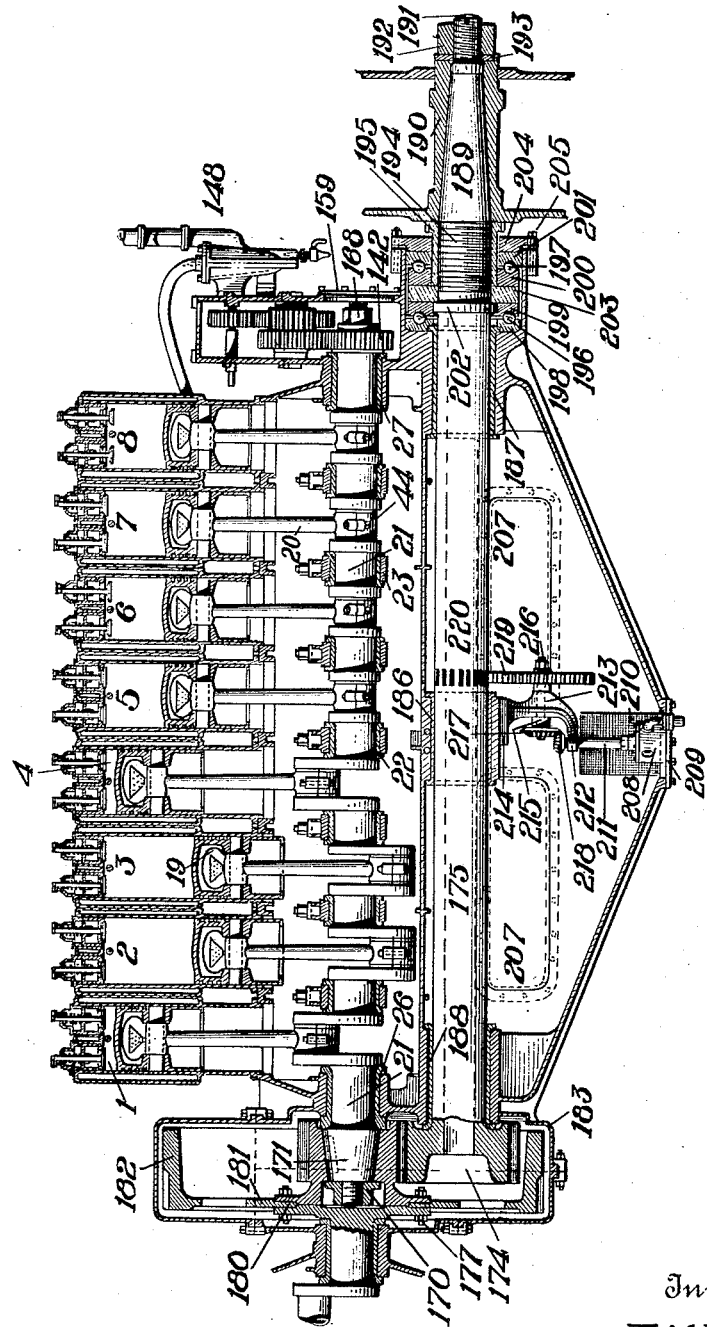
Figure 5 is a longitudinal, sectional view of the front section and coupling means of the engine, parts being omitted.
Figure 6:
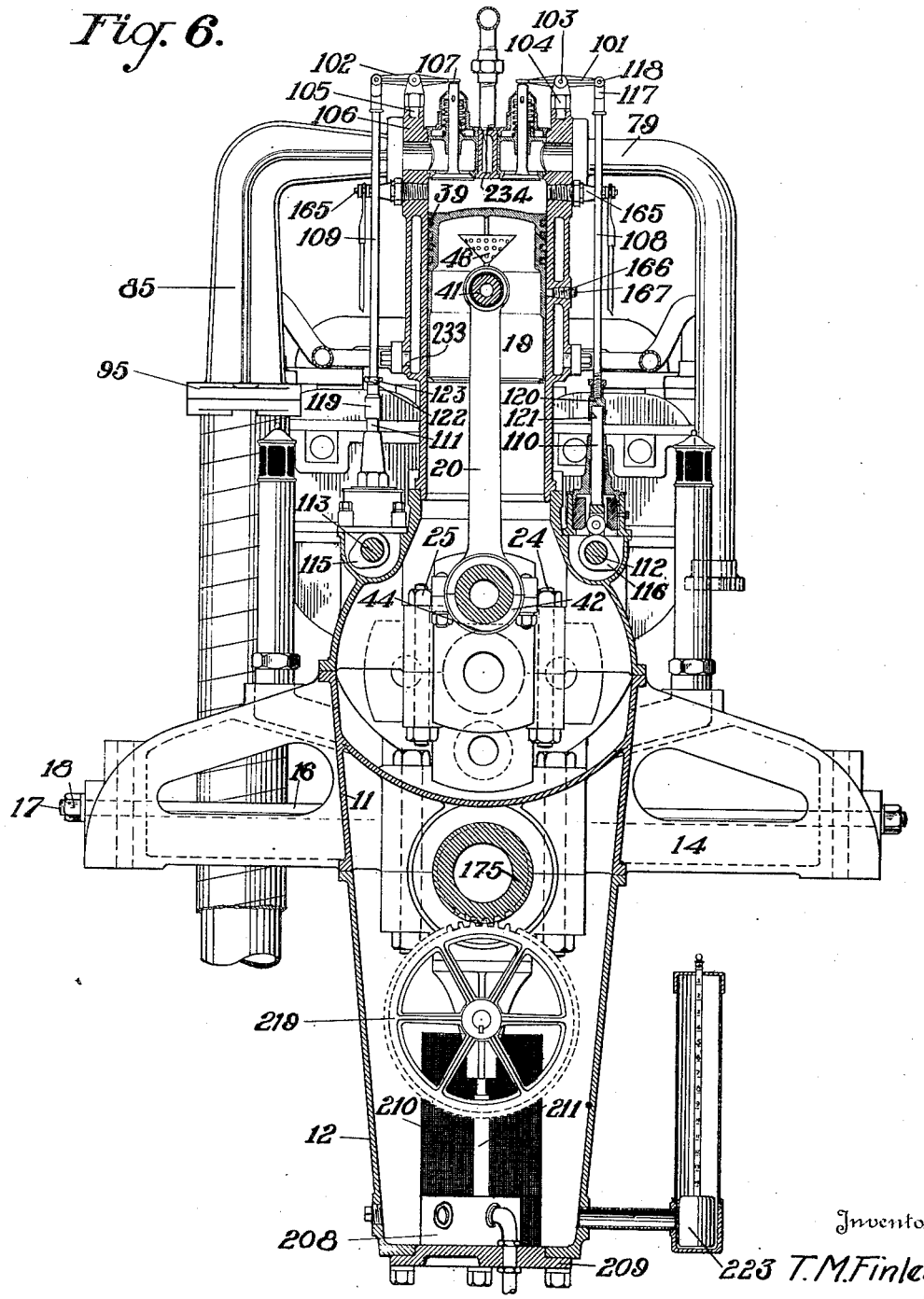
Figure 6 is a transverse, sectional view of the front section of the engine.
Figure 7:
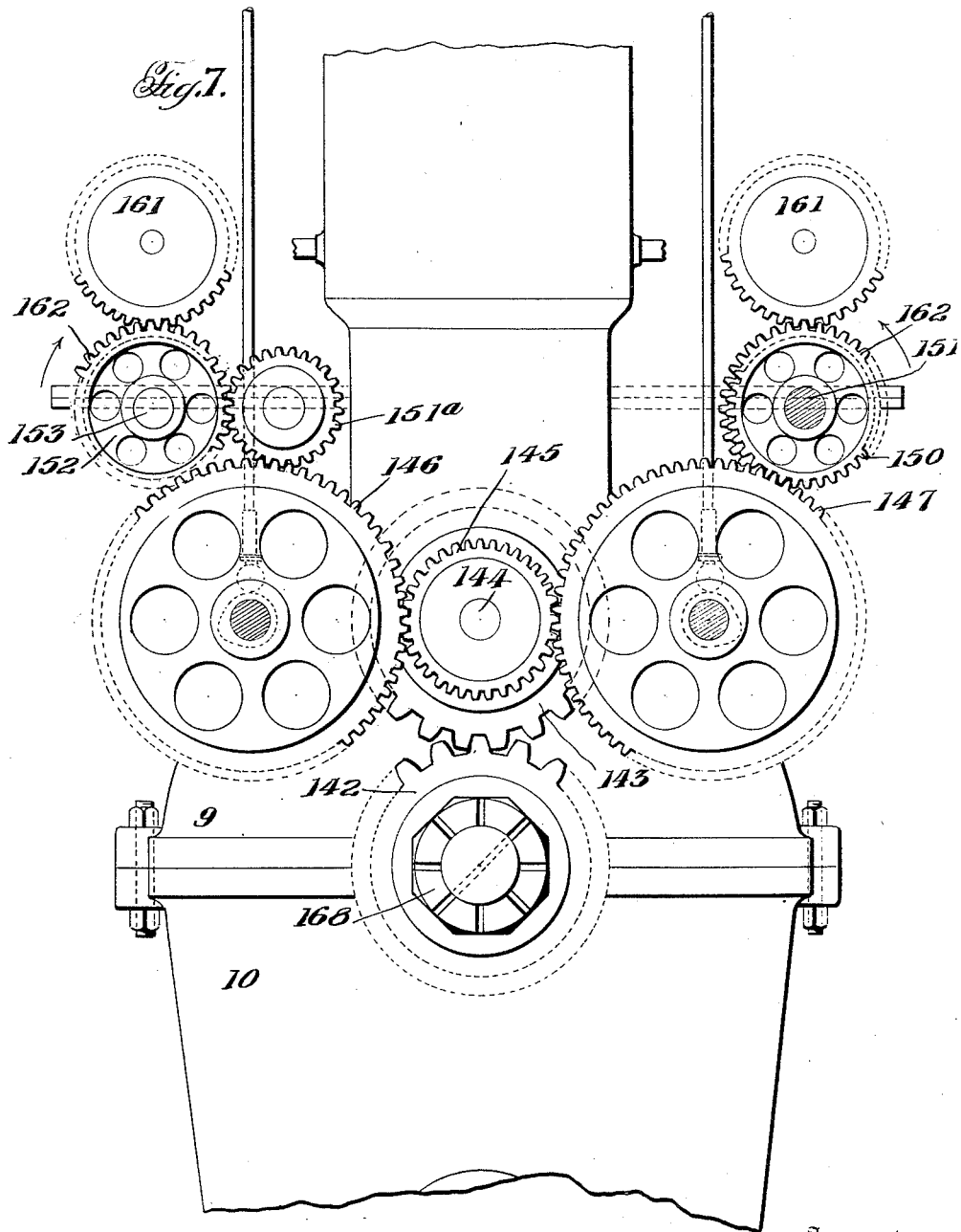
Figure 7 is an elevation, partly in section, illustrating the gearing for transmitting motion from the crank shaft to the cam shaft, the pumps and the magnetos.
Figure 8:
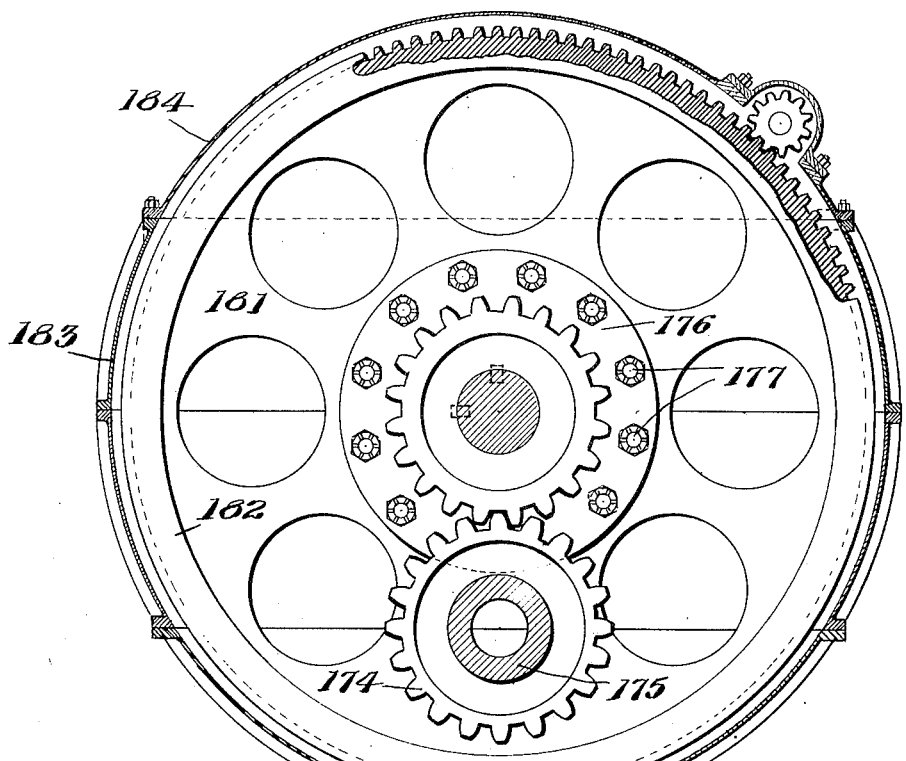
Figure 8 is a transverse, sectional view illustrating the arrangement of the coupling gearing for transmitting motion from the crank shaft to the propeller shaft.

The engine is of the 4-cycle type and the cylinders receive pistons 19 which are connected by connecting rods 20 with cranks of a crank shaft 21, journalled in longitudinally aligned bearings 22 of the crank case. The bearings 22 of the crank case have detachable lower sections 23 which are secured at opposite sides to the upper sections of the bearings by stud bolts 24, threaded at their upper and lower ends for the reception of nuts 25 as clearly shown in Figure 6 of the drawings. The crank case is also provided with inner and outer end bearings, 26 and 27. The cylinders of each set of four are designed to fire in conventional firing order such as 1, 3, 2 and 4. As illustrated in Figure 5, the cranks of the cylinders of the inner set are arranged in a vertical plane, while the cranks of the outer set are disposed horizontally. In the first set the cranks 28 and 29 of cylinders 1 and 4, extend upwardly while the cranks 30 and 31 of cylinders 2 and 3, extend downwardly being placed 180 degrees from the cranks of cylinders 1 and 4. The cranks 32, 33, 34 and 35 of the second set of cylinders are similarly arranged with respect to one another but in a horizontal plane while the cranks 36 and 37 of the crank shaft 38 of the left-hand section of the engine are disposed diagonally or at 45 degrees with rela tion to the cranks of the right hand section. By this arrangement of cranks and cylinders, the engine is mechanically and explosively balanced. The pistons which have suitable packing rings 39 are provided with opposite bearings 40 for the reception of pins 41 for connecting the upper ends of the rods 20 to the pistons and the lower ends of the connecting rods are provided with sectional bearings 42 for the wrist or crank pins of the crank shaft.

Each connecting rod 20 is hollow to form a lubricant passage 43 and the lower section 44 of the bearing 42 is provided with a plurality of slots or grooves 45 adapted in passing through the lubricant to become filled with the same and to carry oil upward from the bottom of the crank case and in the operation of the crank, a quantity of the lubricant will be thrown or splashed upwardly into the upper portion of the hollow piston by the centrifugal action of the crank shaft by the said slots or grooves, and a portion of the lubricant will be caught within a tapered or funnel-shaped receptacle 46, either by its being thrown into the same or by passing through apertures 47 and such lubricant will flow downwardly on the interior of the receptacle 46 which is provided with a tubular portion or neck 48, mounted in the upper bearing 50 of the connecting rod and adapted to deliver the lubricant to the bearing 50 for lubricating the same and the pin 41. Also the excess of such lubricant will flow downwardly through the bore or passage 43 and assist in lubricating the lower bearing 42. In practice, the openings 46 will be punched from the exterior to form internally projecting portions to prevent lubricant from the interior flowing outwardly through the openings to the exterior of the receptacle 46. No claim is made in the present application to this lubricating means, which constitutes the subject matter of a divisional application filed January 27, 1920, Serial No. 354,454.

The cylinders are cored to provide water spaces 51 for a water-cooling system hereinafter described and constituting the subject matter of a divisional application filed January 14, 1920, Serial No. 351,348. The upper end of each cylinder is provided with vertical openings 52 and 53, for the reception of inlet and exhaust valves 54 and 55, arranged in pairs and detachable and interchangeable to afford ready access to the valves and to enable the same to be easily and quickly cleaned, repaired or renewed or any other purpose. Each cylinder by being equipped with a pair of inlet and exhaust valves, is adapted to perform its cycle of operations more completely at high speed than would be possible were only a single inlet and exhaust valve provided for each cylinder as the charge may be quickly introduced into the cylinder at the proper time and the burnt gases may be thoroughly exhausted from the cylinder with less heating of the valve and the adjacent parts and with a minimum liability of permitting unexhausted gases to mix with the incoming charge of fuel and impairing the efficiency thereof.

The stems of the inlet and exhaust valves are engaged by rocker arms 101 and 102, consisting of levers fulcrumed at an intermediate point 103 in bifurcated brackets 104, having shanks 105 threaded in suitable sockets in bosses or enlargements 106 projecting vertically from the upper ends of the cylinders. The brackets have intermediate, octagonal wrench-receiving portions to enable them to be readily screwed into and removed from the sockets of the projections or bosses 106. The rocker arms are provided at their inner ends with rounded portions or heads 107 for engaging the upper ends of the stems of the valves and the outer ends of the rocker arms 101 and 102 are pivotally connected at their outer ends to push rods 108 and 109 which are moved upwardly by cam-actuated rods 110 and 111. The rods 108 and 110 form connections between the rocker arms 101 and an admission cam shaft 112 and the rods 109 and 111 constitute connections between the rocker arms 102 and exhaust cam shafts 113. The cam shafts are rotated by the half-time gearing hereinafter described and the admission and exhaust cams 115 and 116 are set in proper position on the cam shafts 112 and 113 to operate the inlet and the exhaust valves at the proper time, the firing order of the cylinders of each set being preferably 1, 3, 2 and 4, but any conventional firing order may, of course, be employed. The said arrangement of the firing order will produce an alternate exhaust in the two sections or units of the exhaust manifold which will prevent any clogging of the exhaust in the passages of the exhaust manifold, but the construction of the exhaust manifold is such that this clogging is eliminated with any firing order desired.

Each of the connections between the rocker arms and the cams is similar in construction and, like the valve structures, are readily removable and interchangeable. Each push rod has threaded on its upper end a sleeve 117 which is bifurcated to receive the outer end of the rocker arm and to which it is connected by a pivot 118. The lower end of the push rod is threaded into a sleeve 119 provided with a lower enlarged portion 120 having a socket 121 receiving the upper end of the cam-actuated rod and adjustable with respect to the same through its threaded connection with the push rod to secure the desired opening movement of the valve with which the push rod is connected. The socket is secured in its adjustment by a lock washer 122, interposed between the upper end of the sleeve 119 and a nut 123. Any other suitable means, however, may, of course, be employed for securing this sleeve in its adjusted position and the socket connection between the push rod and the cam actuated rod will enable the rods to be readily separated when desired. The length of the socket 121 in the sleeve 119 is of sufficiently greater length than the throw of the cam to prevent any accidental disengagement and permit the desired adjustment to be obtained.

Each cam-actuated rod is provided at its lower end with an enlarged bifurcated head 124, slidable in a vertical opening 125 of a vertical guide sleeve 126 and provided with opposite bearings for the reception of a horizontal pivot pin 127 on which is mounted a roller 128, adapted to be engaged by a cam of one of the cam shafts. The vertical opening 125 is enlarged at an intermediate point at opposite sides, at 129, to provide a passage or way for the roller 128 which projects beyond the side faces of the enlarged bifurcated head or forked portion 124 of the cam-actuated rod. Each cam shaft is journaled in suitable bearings 130 and the cams of each pair of valves operate in a pocket 131 in the crank case and the vertical guide sleeves are mounted in a pair of cylindrical housings 132 of a cap 133 bolted or otherwise secured to the crank case. The guide sleeves 126 are each provided with a vertical groove 134 for the reception of a screw 135, threaded into the cylindrical housings 132 and projecting inwardly therefrom into the groove 134 to prevent rotative movement of the guide sleeve in the housing. Any other suitable means may, of course, be employed for this purpose. Each cylindrical housing is provided with an upper tubular section 136, threaded into the cylindrical housing at 137 and having an upper guiding portion at 138 for maintaining the cam-actuated rod in a vertical position. The tubular section or extension 136 is flanged at its periphery to screw into the cylindrical housing and to fit over the upper edge of the same as shown. The exhaust and admission cam shafts are each preferably made in two longitudinally aligned sections, interlocked at their adjacent ends by a suitable coupling consisting of a tongue or projection 139 extending from one of the sections and fitting in a recess 140 of the adjacent cam shaft section. This construction permits the two sections to be readily separated and assembled. The rotation of the cam shafts carries the cams into contact with the rollers 128 of the cam-actuated rods and the friction incident to the engagement of the cams with the rods is reduced to a minimum. The guide sleeves 126 are provided at the lower ends with arcuate recesses 141 to provide the necessary clearance for the cams and to enable the latter to engage and lift the rollers of the vertically movable cam-actuated rods.

The cam shafts are rotated by half-time gearing comprising a gear wheel 142 mounted on the outer end of the crank shaft and meshing with an idler gear 143 located centrally above the crank shaft and mounted on a stub shaft 144, and connected with a pinion 145. The idler gear 143 is preferably formed integral with the pinion 145, but they may be connected in any other desired manner, and the pinion 145 meshes with cam shaft gears 146 and 147 located at opposite sides of the centrally arranged pinion 145. The crank shaft gear 142 and the idler gear 143 are of the same speed ratio, namely, one to one, and the speed ratio of the centrally arranged pinion 145 and the cam shaft gears 146 and 147 is one to two. This particular arrangement of gears enables smaller gears to be employed in half-time gearing than heretofore and the noise and friction incident to such gearing are reduced to a minimum while the durability and efficiency of the gearing are correspondingly increased, with the decrease of the tooth speed.

Figure 2:
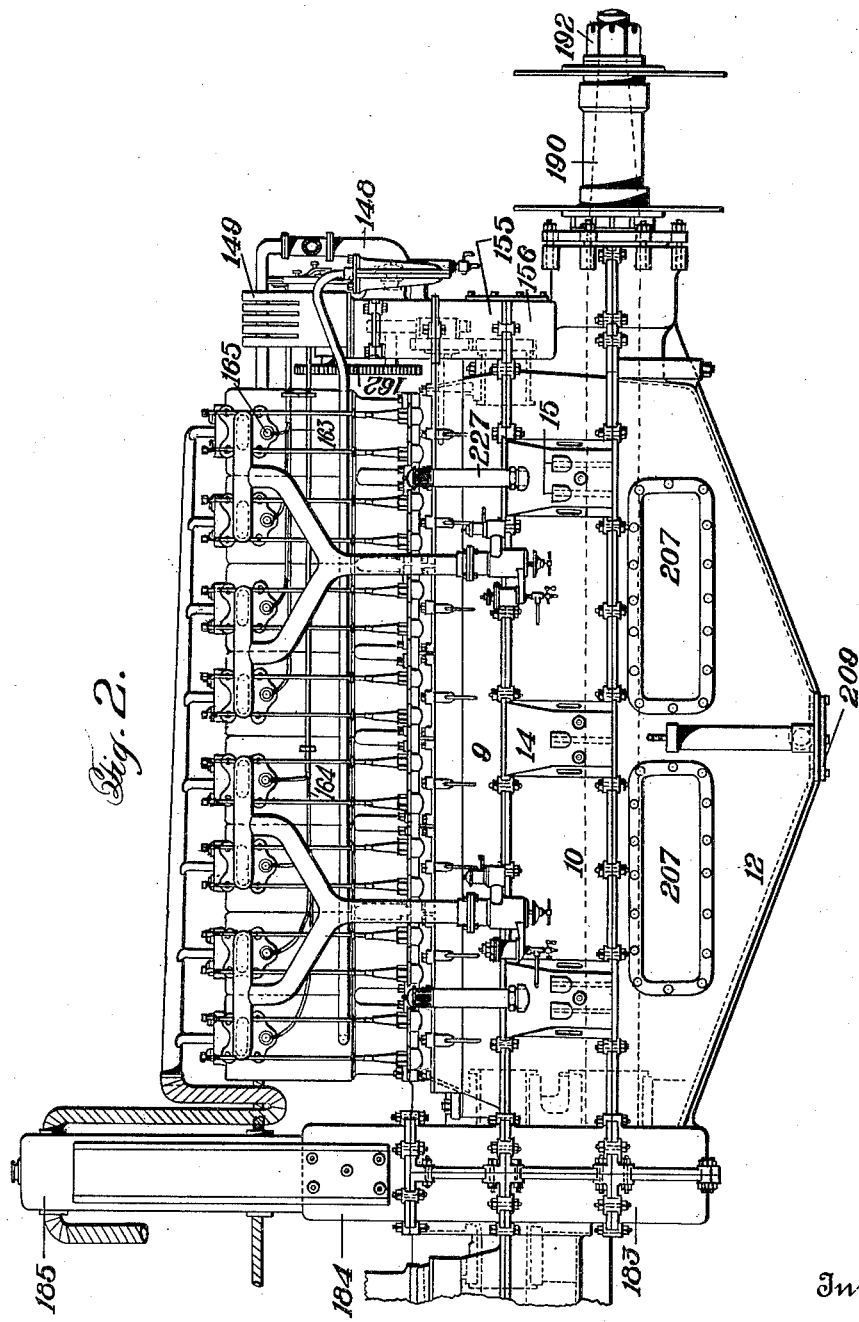
Figure 2 is an elevation of the inlet side of the engine.

The half-time gearing is also employed for operating pumps 148 of the cooling system and magnetos 149 of the ignition system. The cam gear 147 of the exhaust cam shaft meshes with the gear 150 of the shaft 151 of one of the pumps and the gear 146 of the admission cam shaft meshes with an idler pinion 151ª and the latter meshes with a gear 152 mounted on the shaft 153 of the other pump. The gear wheel 150 rotates in the direction of the arrow in Figure 18 of the drawings, its upper portion moving inwardly and the gear wheel 152 of the other pump shaft is rotated correspondingly with its upper portion moving inwardly owing to the employment of the idler 151. The gearing for operating the cam shafts and the pumps from the crank shaft is arranged within a sectional casing 154 composed of an intermediate section 155, a bottom section 156, an upper section 157 and a cap 158. The sectional casing 154 which is provided with a removable face plate 159 to afford ready access to the interior of the casing at the crank shaft, has mounted upon it a pair of magnetos 149 which are operated by gears 161 and 162, arranged in pairs at opposite sides of the sectional casing at the rear or inner wall thereof, exteriorly of the same and the gears 161 and 162 may be constructed of fiber or other non-metallic material or they may be constructed of metal and any suitable form of housing may be employed for encasing these gears. The gear 161 is mounted on the shaft of the commutator and the gear 162 is mounted on the shaft of the adjacent pump. In order to provide a simple ignition system with minimum wiring, each engine section of the engine is equipped with a pair of magnetos, one magneto being provided for each set of four cylinders, the wires 163 and 164 in practice of uniform length being preferably arranged as indicated in Figure 2 of the drawings, but any other desired arrangement of the wires may be provided and each cylinder may be equipped with a pair of spark plugs 165 and either one or both may be employed. Also each cylinder is provided at an intermediate point with a threaded opening 166 adapted to receive a suitable valve designed to be employed for reducing the charge to one-half the normal displacement of the piston for starting the engine. Any suitable valve mechanism and controlling means may, of course, be employed for this purpose and when it is not desired to use such charge reducing valves, the opening in each cylinder may be closed by an ordinary screw plug 167.

Figure 3:
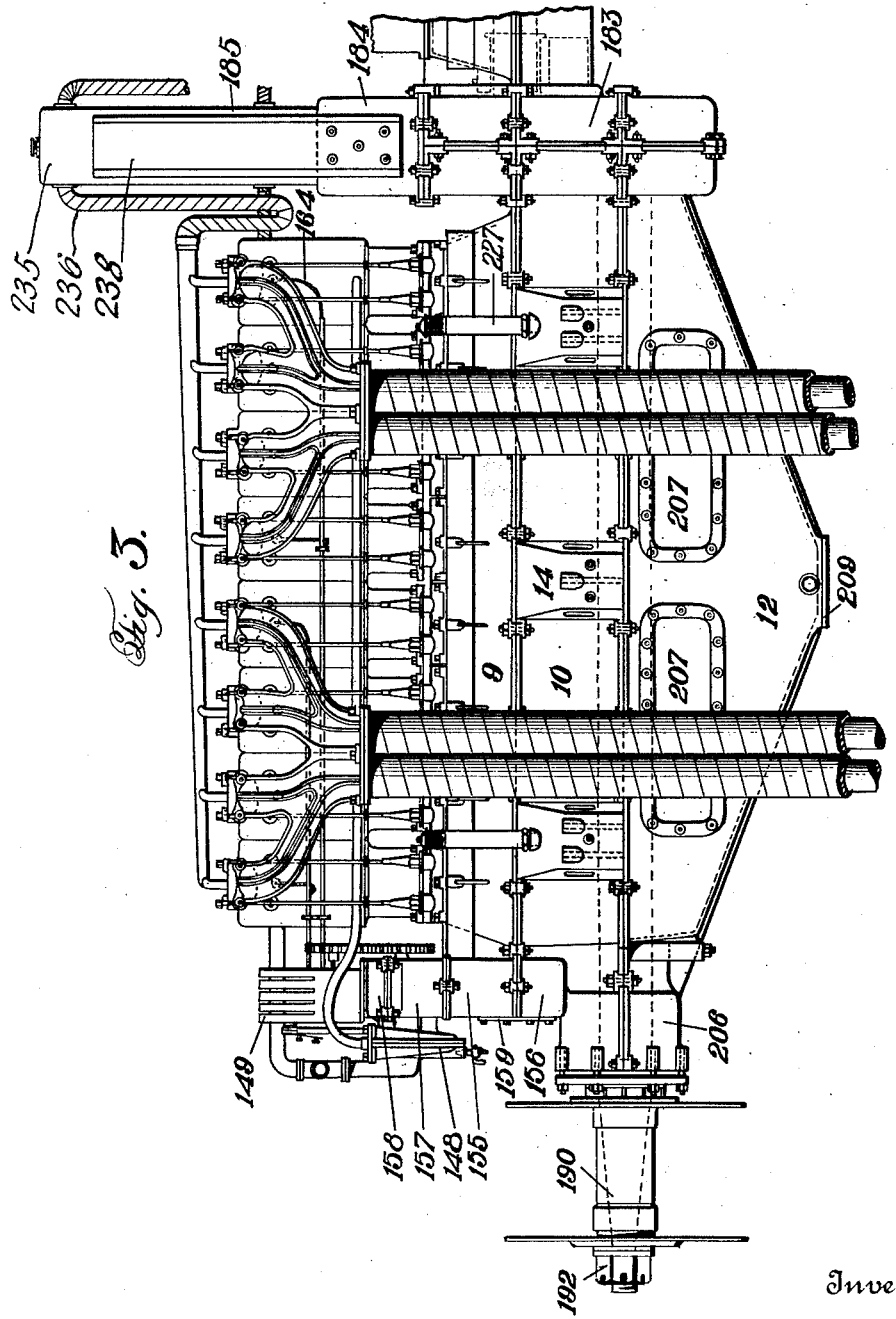
Figure 3 is a similar view of the exhaust side of the engine.
Figure 4:
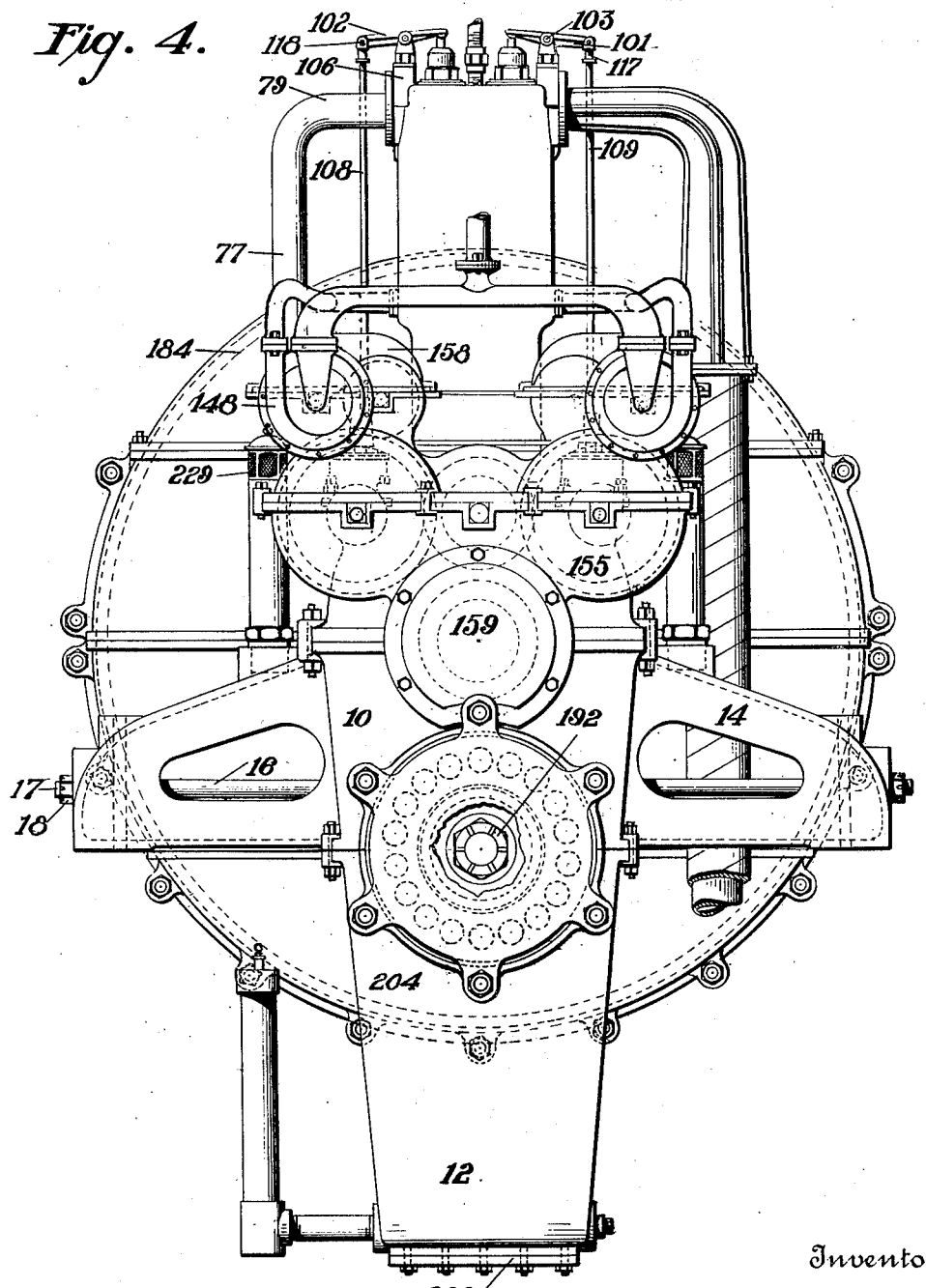
Figure 4 is an elevation of the front end of the engine.

The crank shaft gear 142 is retained on the front or outer end of the crank shaft by a nut 168, threaded on the end of the crank shaft and secured by suitable locking means, against accidental retrograde rotation. The other end 169 of the crank shaft is threaded to receive a nut 170 and it is provided adjacent to its threaded end with a tapered portion 171, grooved to receive keys 172 for keying a crank shaft pinion or gear 173 to the inner end of the crank shaft. The crank shaft pinion 173 has a tapered bore or opening in its hub to fit the tapered portion 171 and it is retained in place by the nut 170 which is secured against accidental rotation on the crank shaft by means of a cotter pin or other suitable locking device. The crank shaft gear 173 which transmits the power of the engine centrally thereof and at the point of connection of the longitudinally aligned crank shafts of the front and rear engine sections, meshes with a pinion or gear 174 of a propeller shaft 175. The power transmission pinion or gear 173 constitutes an element of the coupling means for connecting the separate crank shafts of the engine sections of the engine and it is provided with an extended hub portion 175ª forming a recess or housing for the nut 170 and provided with an annular, attaching flange 176 which is secured by bolts 177, to a corresponding attaching flange 178 formed integral with the inner end of the crank shaft of the rear engine section. The attaching flanges 176 and 178 are provided at their inner faces with peripheral recesses 179 for the reception of a reduced inner portion 180 of a web 181 of a fly-wheel rim 182. The fly-wheel rim 182 and web constitute a fly-wheel for the engine and the rim extends forwardly from the web and the crank shaft transmission gear and the propeller gear 174 are arranged within the fly-wheel rim as clearly illustrated in Figure 5 of the drawings. The gearing is protected by a sectional housing 183 preferably divided vertically and horizontally as clearly illustrated in Figures 2 and 3 of the drawings and provided with a removable cap 184 on which is mounted a vertically movable radiator 185.

The fly-wheel and the flanges of the crank shafts of the front and rear engine sections are firmly and detachably connected together by the bolts 177 and by employing front and rear engine sections the crank shaft is divided centrally and the power is transmitted from the engine centrally of the same and the crank shafts are relieved of the excessive torsional strain which would result if a single continuous crank shaft were employed and the power taken from one end thereof. A much lighter, more durable and efficient power unit is thereby produced and the size and weight and consequently the ratio of the mass to the power is materially reduced and it is evident that a much heavier continuous shaft would be required for sustaining the strains and transmitting the power of 16 cylinders arranged in longitudinal alignment. The combined coupling means and power transmission gearing constitute the subject matter of a separate divisional application filed January 14, 1920, Serial No. 351,350.

The propeller shaft 175 extends longitudinally of the front engine section and is located below the crank shaft and within the upper portion of the oil sump and it is mounted in central and front and rear bearings 186, 187 and 188, which may be of any desired construction and the propeller shaft has a tapered front terminal portion 189 for the reception of a propeller hub 190. The outer or front end 191 of the propeller shaft is threaded for the reception of a nut 192 and a washer 193 is interposed between the nut and the propeller hub. A cotter pin or other suitable locking device is employed for locking the nut 192 to the propeller shaft and the latter is provided adjacent the tapered portion 189 with a threaded cylindrical portion 194 receiving a threaded bearing sleeve 195, extending into an end thrust bearing. The propeller hub abuts against the outer end of the bearing sleeve which is enlarged at the outer end adjacent to the propeller hub and the end thrust bearing comprises in its construction, inner and outer sets of antifriction balls 196 and 197 arranged in races formed by grooved rings 198, 199, 200 and 201. The propeller shaft is provided between the inner and outer antifriction devices with a fixed collar 202 and an end thrust ring 203, which abuts against the fixed collar 202 interposed between the bearing rings 199 and 200. The parts of the end thrust bearing are retained in position by a collar 204 which is secured by bolts 205 to the bearing housing 206 and when it is desired to remove the bearing, the hub is detached, the bearing sleeve 195 is unscrewed from the propeller shaft and the collar 204 is unbolted. This will enable the end thrust bearing to be readily withdrawn from the housing 206.

The oil sump is provided with removable plates 207 to afford ready access to the interior of the sump and an oil pump 208 located at the bottom of the sump and mounted upon a removable bottom plate 209, bolted or otherwise secured to the oil sump at the apex or lowest point thereof. The oil pump which is arranged within a cylindrical screen 210 is of the rotary type and is provided with a vertical shaft 211 extending upwardly from the oil pump and mounted at its upper end in a vertical bearing 212 of an arm of a bearing bracket 213. The bearing bracket 213 which is provided at the top with an attaching plate or portion 214, is bolted or otherwise secured to the central bearing of the propeller shaft at the bottom and the said bracket 213 is provided at an intermediate point with a horizontal bearing 215 in which is mounted a horizontal shaft 216. The horizontal shaft 216 is provided at its rear end with a vertically disposed beveled gear 217 meshing with a horizontal beveled pinion 218 mounted upon the upper end of a vertical shaft 211 of the oil pump. The front portion of the horizontal shaft 216 carries a vertical gear 219 which meshes with a gear 220 consisting of teeth formed by recesses cut in the propeller shaft adjacent to the central bearing. This arrangement of gearing simplifies the means for operating the pump and enables the same to be actuated by the propeller shaft. Also the gearing is located entirely within the oil sump and a short direct connection between the centrally arranged oil pump and the central portions of the propeller shaft is provided, having a minimum number of parts.

Figure 9:
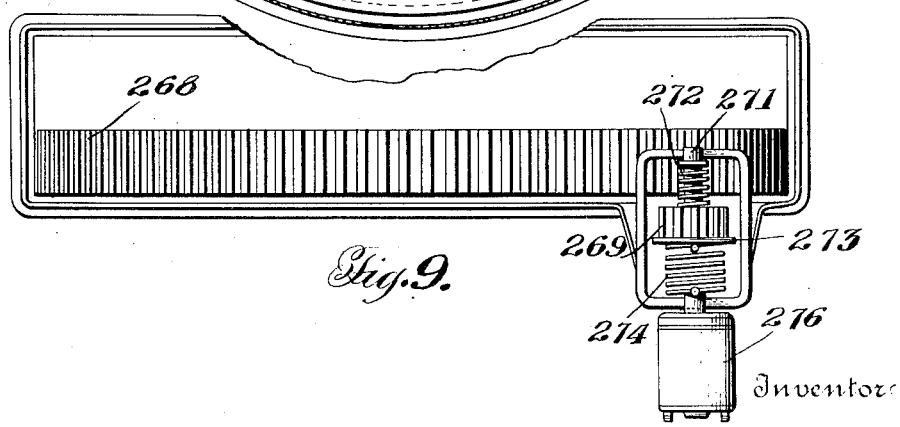
Figure 9 is a plan view of a portion of the same, the upper sectional cap of the casing being removed to illustrate the arrangement of the starter.

The rim of the fly-wheel of the coupling gearing is provided with spur teeth 268 preferably cut in the said rim 182 and adapted to mesh with a pinion 269 of suitable starting means. The starting device as illustrated in Figure 9 of the drawings is of the standard type and comprises a motor 270 having a threaded armature shaft 271 having a coarse thread 272 adapted to engage interior threads of a pinion sleeve 273. The pinion sleeve 273 consists of a sleeve interiorly threaded to engage with the said threads 272 and having exterior spur teeth to mesh with the said teeth 268 of the rim 282 and normally maintained out of engagement with the teeth of the rim 182 by a coiled spring 274. The starting device which may be of any other desired construction operates in the usual manner and begins to turn slowly as the current from the battery (not shown) enters in the usual manner through a resistance and the threaded connection between the armature shaft and the sleeve pinion moves the sleeve with its pinion element along the shaft towards the rim 182 and into mesh with the teeth 268 thereof. After the pinion of the starting device is in mesh with the rim and the latter begins to rotate the resistance is cut out and the full force of the current operates the motor of the starter and effects the cranking of the engine sections. As soon as the current is thrown off of the starting device, after the engine sections have taken up their cycle of operation, the spring 274 withdraws the pinion sleeve from the rim of the fly-wheel in the usual manner.

What we claim is:

1. A motor power unit including front and rear engine sections having separate aligned crank shafts, means for rigidly securing the inner ends of the crank shafts together to provide a single continuous crank shaft and to form a single unitary engine structure, and means located below one of the said crank shafts and contained within the front engine section for taking the power of the unit from the inner connected ends of the crank shafts to divide the torque of the single continuous crank shaft and transmit the power to the outer end of the front engine section.

2. A motor power unit including engine sections arranged in longitudinal alignment and provided with separate crank shafts, means for rigidly securing the inner ends of the crank shafts together to form a single continuous crank shaft and provide a single unitary engine structure, means for taking power from the inner ends of the crank shafts to divide the torque of the single continuous crank shaft, a longitudinal power transmission shaft located below and arranged in parallelism with one of the crank shafts and extending to the outer end of the engine section having such crank shaft, and means actuated by the said means for rotating the power transmission shaft.

3. A motor power unit including front and rear engine sections arranged in longitudinal alignment, a longitudinal shaft mounted within the front engine section and extending to the outer end thereof, means for rigidly fastening the inner ends of the crank shafts together to form a single continuous crank shaft and provide a single unitary engine structure, a longitudinal shaft mounted within the front engine section and extending to the outer end thereof and located beneath the front crank shaft, and means for operatively connecting the inner ends of the longitudinal power shaft with the inner connected ends of the crank shafts for rotating the power shaft and for taking the power from the said inner ends of the crank shafts to divide the torque of the single continuous crank shaft.

4. A motor power unit comprising two longitudinally aligned engine sections having vertical cylinders and provided with separate longitudinally aligned crank shafts located below the cylinders, means for rigidly fastening the inner ends of the crank shafts together to form a single continuous crank shaft and unite the two engine sections to form a unitary engine structure and for taking the power from the inner connected ends of the crank shafts to divide the torque of the said single continuous crank shaft, and means contained within one of the said engine sections and located beneath the crank shaft thereof and operatively connected with the said means for transmittitng the power therefrom to one end of the said unitary engine structure.

5. A motor power unit comprising two longitudinally aligned engine sections having vertical cylinders and provided with separate longitudinally aligned crank shafts located beneath the cylinders, a longitudinal power transmission shaft located within one of the engine sections below the crank shaft thereof and means for rigidly fastening the inner ends of the crank shafts together to form a single continuous crank shaft and unite the engine sections in a single unitary engine structure and for operatively connecting the power shaft with the inner connected ends of the crank shafts to take the power therefrom and divide the torque of the said continuous crank shaft.

6. A motor power unit comprising two longitudinally aligned engine sections having vertical cylinders and provided with separate longitudinally aligned crank shafts located below the cylinders, a longitudinal power transmission shaft arranged within one of the engine sections and located below the crank shaft thereof and extending in parallelism with the said crank shaft to the outer end of such engine section to deliver the power to that point, and means for rigidly fastening the inner ends of the crank shafts together to form a single continuous crank shaft and unite the engine sections in a single unitary engine structure, and for operatively connecting the power shaft with the inner connected ends of the crank shafts to take the power therefrom and divide the torque of the said continuous crank shaft.

7. A motor power unit comprising front and rear longitudinally aligned engine sections having vertical cylinders and separate longitudinally aligned crank shafts located below the cylinders, said engine sections having front and rear casings enclosing the crank shafts, a longitudinal power transmission shaft housed within the front casing and located below the front crank shaft and extending to the outer end of the front engine section, and means for rigidly fastening the inner ends of the crank shafts together to form a single continuous crank shaft and unite the engine sections in a single unitary engine structure and for operatively connecting the power shaft with the inner connected ends of the crank shafts and divide the torque of the continuous crank shaft by taking the power from the said inner ends of the connected crank shafts.

8. A motor power unit comprising front and rear longitudinally aligned engine sections having separate longitudinally aligned crank shafts, said engine sections being each composed of two aligned sets of four vertical cylinders and said crank shafts being located below the cylinders and provided with steps of cranks arranged in planes at right angles to each other and the cranks of one crank shaft being disposed at an inclination when the cranks of the other crank shaft are arranged in vertical and horizontal planes respectively, to mechanically and explosively balance the engine sections, a longitudinal power transmission shaft located below the crank shaft of the front engine section and extending to the outer end thereof, and means for rigidly fastening the inner ends of the crank shaft together to form a single continuous crank shaft and unite the engine sections in a single unitary engine structure, and for operatively connecting the power shaft with the inner ends of the crank shafts to take the power therefrom and divide the torque of the said continuous crank shaft.

In testimony whereof we affix our signatures.

THOMAS MILTON FINLEY.
ALLEN W. BROWN.